United States Patent Office 3,839,488
Patented Oct. 1, 1974

3,839,488
PROPYLENE-ISOPARAFFIN ALKYLATION
PROCESS
Paul J. Kuchar, Hinsdale, Ill., assignor to Universal Oil
Products Company, Des Plaines, Ill.
No Drawing. Filed Oct. 16, 1972, Ser. No. 298,125
Int. Cl. C07c 3/54
U.S. Cl. 260—683.48                              5 Claims

ABSTRACT OF THE DISCLOSURE

A process for alkylation of isobutane with propylene using hydrogen fluoride alkylation catalyst. The propylene and isobutane are contacted with the catalyst at specific alkylation conditions to produce an increased yield of high octane alkylate product requiring a smaller concentration and consumption of the isobutane and catalyst, said conditions including a ratio of hydrogen fluoride catalyst to hydrocarbons of about 0.005 to about 0.5 volumes of catalyst per volume of combined isobutane and propylene, the hydrocarbons constituting a continuous phase having the catalyst dispersed therein.

BACKGROUND OF THE INVENTION

This invention relates to a process for alkylating an isoparaffinic hydrocarbon with propylene utilizing hydrogen fluoride alkylation catalyst.

This invention further relates to a process for producing higher molecular weight, high octane motor fuel hydrocarbons from lower molecular weight isoparaffins and propylene.

In a limited aspect, the present invention relates to a process for alkylating isobutane with propylene to produce primarily $C_7$ branched hydrocarbons.

Alkylation of isoparaffinic hydrocarbons such as isobutane, isopentane and the like, with olefinic hydrocarbons such as propylene, butylenes, and amylenes, is well known as a commercially important method for producing gasoline boiling range hydrocarbons. The $C_5$–$C_{10}$ hydrocarbons generally produced by the isoparaffin-olefin reaction are termed "alkylate." Alkylate is particularly valuable as a motor fuel blending stock because of its high octane ratings. Alkylate is used to improve the overall octane rating of available gasoline pools to comply with the requirements of modern automobile motors. High octane alkylate fuel components are particularly important in providing motor fuel of sufficiently high quality in the case where it is desired to avoid using alkyl lead compounds in the fuel to meet octane requirements. A continuing goal of the art is to provide an alkylation process which produces an alkylate product having higher motor and research octane rating than is possible using conventional alkylation processes, and to reduce the cost and difficulty of producing such alkylate.

In general, commercial isoparaffin-olefin alkylation processes employ isobutane and sometimes isopentane as the isoparaffinic reactant and use propylene, butylenes or amylenes as the olefin. Catalysts utilized include hydrogen fluoride, sulfuric acid, and other like acidic or acid-acting materials. In alkylation operations using hydrogen fluoride as the catalyst, the olefin, isoparaffin and hydrogen fluoride catalyst are typically contacted at a catalyst hydrocarbon volume ratio of about 1:1 to about 2:1 and agitated in an alkylation reactor, forming a reaction mixture. The reaction mixture is made up of an emulsion or dispersion of the hydrocarbons in the catalyst, the hydrocarbons being generally immiscible with the catalyst. After the alkylation reaction is substantially complete, the reaction mixture is withdrawn from the reactor and is settled, resulting in distinct hydrocarbon and catalyst phases, in a conventional separation zone such as a settling vessel, with the catalyst phase thus separated being recycled to the reactor for further use. The hydrocarbon phase produced in the settling operation is further processed, typically by fractionation, to recover the higher molecular weight alkylate product and to separate unconsumed isoparaffin for further use by recycle to the alkylation reactor. It has been found necessary to undertake commercial isoparaffin-olefin alkylation operations at fairly specific reaction conditions, such as temperature, pressure, and concentrations of the catalyst and reactants in the reaction mixture. This has been found necessary in order to produce an acceptable yield of the desired high quality alkylate product. One of the conditions required to provide a product having the desired utility as a high octane blending stock has been a large excess of the isoparaffin relative to the amount of olefin employed, e.g., an isoparaffin/olefin mole ratio of about 8:1 to about 30.1. The primary limitations on the amount of excess isoparaffin which is conventionally employed are the capital and utilities costs entailed by equipment needed to separate the excess isoparaffin from the alkylate subsequent to the alkylation step. Raising the isoparaffin/olefin mole ratio in the reactor improves the quality of the alkylate produced in the reactor. This improvement is found to occur when the isoparaffin/olefin mole ratio in the alkylation reactor is raised to levels found uneconomical in the prior art because of unduly high fractionation costs. Commercial alkylation operations are thus limited as to the quality of the product which can be produced by the limited amount of excess isoparaffin which can economically be recovered and recycled to the alkylation reactor after fractionation of the hydrocarbon phase produced by the settling operation.

Prior art alkylation processes employing propylene as the olefin have utilized alkylation conditions which favor what is known in the art as the hydrogen transfer reaction in order to produce an alkylate product having high octane ratings. In the hydrogen transfer reaction a molecule of propylene and a molecule of the isoparaffin employed, generally isobutane, react to form propane and to form the olefin corresponding to the isoparaffin, e.g., isobutylene in the case of isobutane. The olefin thus formed in the hydrogen transfer reaction, e.g., isobutylene, then further reacts with another molecule of isobutane in an alkylation reaction to form higher molecular weight alkylate. The propane produced in the hydrogen transfer reaction from the propylene is relatively unreactive to further alkylation and provision is made for its removal from the system to prevent build-up.

In modern petroleum refineries, the supply of isoparaffins, especially isobutane, is a limiting factor in the amount of alkylate which can be produced. That is, there is a relative shortage of isobutane relative to light olefins in most current refinery situations. The use of the hydrogen transfer reaction to provide a good quality alkylate product when utilizing propylene is, thus, relatively less desirable than direct alkylation of the isobutane with propylene to produce high octane alkylate, since two moles of isobutane are consumed to produce one mole of alkylate by hydrogen transfer. However, prior art has not been able to produce alkylate of sufficient quality, when using propylene as a reactant, without the use of alkylation conditions which result in hydrogen transfer. Another limitation found in prior art alkylation processes utilizing propylene is the production of excess amounts of propane, generally a relatively less desirable by-product which is necessarily produced in the hydrogen transfer reaction. For example, prior art has been unable to make high quality alkylate containing high concentrations of high octane branched chain $C_7$ hydrocarbons, which result from the direct alkylation of isobutane with propylene to form one mole of alkylate from one mole of isobutane. Instead, prior art processes have resorted to the hydrogen transfer reaction to produce $C_8$ hydrocarbons, resulting in excessive consumption of isobutane with a concurrent wasteful production of the undesirable by-product propane. The process of the present invention is directed, in part, to providing a method for producing high quality alkylate from the direct alkylation of isoparaffins with propylene to provide, in the case when the isoparaffin is isobutane, an alkylate product containing increased amounts of higher octane $C_7$ products, particularly 2,3-dimethylpentane, while decreasing the amount of isobutane consumed and the amount of propane by-product produced.

SUMMARY OF INVENTION

An object of the present invention is to provide a process for alkylating an isoparaffin with propylene utilizing a hydrogen fluoride catalyst.

Another object of the present invention is to provide an alkylation process utilizing propylene in which a high quality alkylate product is produced, and wherein the hydrogen transfer reaction between propylene and an isoparaffin is not required to provide a high quality alkylate product.

Another object of the present invention is to provide an isoparaffin-propylene alkylation process in which the production of high octane $C_7$ hydrocarbons is increased.

Still another object of the present invention is to provide a hydrogen fluoride-catalyzed isoparaffin-propylene alkylation process in which there is a decreased requirement for supplies of hydrogen fluoride catalyst.

Another object of the present invention to provide an isoparaffin-propylene alkylation process wherein high quality alkylate can be produced using a lower isoparaffin/olefin mole ratio under alkylation reaction conditions.

In an embodiment, the present invention relates to a process for producing an alkylation reaction product from propylene and an isoparaffin, utilizing a hydrogen fluoride alkylation catalyst, which comprises contacting the isoparaffin and propylene with the hydrogen fluoride catalyst at alkylation conditions in an alkylation zone to form an alkylation reaction mixture, the hydrogen fluoride catalyst comprising about 0.5 vol. percent to about 30.0 vol. percent of the reaction mixture, and subsequently recovering the alkylation reaction product from the reaction mixture.

I have found that isoparaffins may be alkylated with propylene to form high octane hydrocarbons utilizing a lesser degree of the hydrogen transfer reaction yet providing high octane products. By maintaining the concentrations of the hydrocarbon reactants and the hydrogen fluoride catalyst within specific ranges of concentration, hereinafter fully described, during the course of the alkylation reaction, it is possible to alkylate the isoparaffin directly with propylene to produce an alkylate of high quality. Moreover, the amount of isoparaffin and hydrogen fluoride required is substantially smaller than employed in prior art to provide alkylate of equivalent quality. The present process thus provides a variety of advantages over prior art alkylation processes. One important advantage is the reduced consumption of isoparaffin in the process, whereby the relatively scarce supply of such hydrocarbons may be utilized more efficiently. Another distinct advantage of the present process over prior art is that high quality products can be produced with a lower isoparaffin/propylene mole ratio requirement during the alkylation reaction. This feature represents a significant decrease in the amount of isoparaffin which must be separated from the alkylate product subsequent to the alkylation reaction for recycle to the alkylation reaction step. A further advantage of the present process is the reduction in the amount of hydrogen fluoride catalyst required relative to the hydrocarbon being processed. Conventionally, about 1 volume to about 2 volumes of catalysts are required for each volume of isoparaffin and olefin, taken together, which are processed in the alkylation reactor. By employing the process of the present invention, the amount of catalyst required represents only a small fraction of the hydrocarbons to be processed. Thus, a significant savings in capital and utilities expenditures can be effected with the present process.

Further objects, embodiments and advantages of the process of the present invention will be apparent to those skilled in the art from the detailed description of the invention hereinafter provided.

DETAILED DESCRIPTION OF INVENTION

The isoparaffins suitable for use in the present process include those generally employed in the prior art. The preferred isoparaffins are isobutane, isopentane, and isohexane, particularly isobutane. A mixture of two or more suitable isoparaffins, such as isobutane and isopentane, may also be employed. Isoparaffin feed stocks employed as the isoparaffinic reactant in the present process may contain some non-reactive contaminants such as normal paraffins. For example, a conventional isobutane alkylation reactant generally contains some n-butane and some propane.

The propylene employed as a reactant in the present process is well known in the art. Pure propylene may suitably be utilized. Also suitable is a typical commerical propylene alkylation reactant, which generally contains minor amounts of paraffins, ethylene, etc., and especially propane, which is inert in the alkylation reaction. For example, a standard propylene feed stock employed in alkylation may comprise about 60 wt. percent propylene and about 40 wt. percent propane.

The hydrogen fluoride catalyst employed in the process of the present invention is well known in the art. Conventional hydrogen fluoride alkylation catalyst comprises about 75 wt. percent or more of titratable acid and about 5 wt. percent or less of water, the remainder being organic diluent. Such a conventional hydrogen fluoride alkylation catalyst is suitable for use in the present process. Acid concentrations in the catalyst between about 75 wt. percent and about 99 wt. percent or more are preferred, and a water content of about 1 wt. percent or less is also preferred.

Numerous alkylation reaction zones suitable for use in the process of the present invention are known in the art. In general, any alkylation reactor which is suitable for prior art alkylation reactions is also suitable for the present process. For example, but not by way of limitation, the alkylation reactors described in U.S. Pats. 3,456,033, 3,469,949 and 3,501,536 may suitably be employed when the process of the present invention is embodied in a preferred continuous-type operation.

Alkylation conditions suitable for use in an embodiment of the present process include a temperature of about 0° F. to about 200° F., a pressure sufficient to maintain the reactants and the hydrogen fluoride catalyst in the liquid phase, and a contact time between the hydrocarbons and catalyst of about 0.1 minute to about 30 minutes. It is preferred that the mole ratio of the isoparaffin to the propylene introduced into the alkylation reaction zone be maintained at about 5:1 to about 25:1, and an especially preferred isoparaffin/propylene mole ratio is about 10:1 to about 20:1. A contact time of about 0.5 minute to about 20 minutes is also preferred.

Means for separating the hydrocarbon phase from the hydrogen fluoride catalyst phase by settling the reaction mixture effluent from an alkylation reactor, in order to provide a hydrocarbon stream from which the alkylate product may be recovered, are necessary for operation of the process. Generally, the effluent from an alkylation reactor includes an emulsion of hydrocarbons and catalyst, including excess isoparaffin, alkylation reaction products, hydrogen fluoride catalyst and catalyst-soluble organic materials. When this mixture is allowed to stand unstirred, i.e., settled, the alkylation reaction products, isoparaffin and light hydrocarbon gases such as propane form a hydrocarbon phase containing a small amount of catalyst in solution. The catalyst and catalyst-soluble hydrocrbons form a separate heavier phase. The hydrocarbon phase is then easily mechanically separated from the catalyst phase. The temperature and pressure maintained during such a settling operation in a hydrogen fluoride catalyzed alkylation process are substantially the same as those described above in connection with hydrogen fluoride alkylation conditions employed in the alkylation reactor. The hydrocarbons and catalyst are preferably maintained in the liquid phase during the settling operation.

Some means for withdrawing heat from the alkylation zone is necessary for operation of the process. A variety of means for accomplishing the heat withdrawal are well known. For example, in one embodiment the heat generated in the alkylation reactor may be withdrawn directly from the alkylation reactor by indirect heat exchange between cooling water and the reaction mixture in the reactor.

The hydrocarbon phase recovered from the settling procedure is preferably passed to a conventional fractionation operation, such as isobutane stripper, whereby the alkylate product is separated from unconsumed isoparaffin and from any hydrogen fluoride which may be present in the hydrocarbons taken from the settler. Any suitable method utilized in the prior art to fractionate the hydrocarbons from the settler may be employed to separate the alkylation product from the isoparaffin in the present process.

An essential feature of the process of the present invention is the use of particular relative concentrations of the catalyst and the hydrocarbon reactants in the alkylation zone. The amount of hydrocarbons and catalyst passed into the alkylation zone should be such that, when the hydrocarbons are admixed with the hydrogen fluoride alkylation catalyst to form the alkylation reaction mixture, the hydrocarbons constitute a continuous phase with the catalyst being present in the form of an emulsion or a dispersion in the hydrocarbons. The "catalyst/hydrocarbon volume ratio" refers to the total volume of catalyst introduced into the alkylation zone relative to the total volume of hydrocarbons introduced into the alkylation zone during a particular period. Conventionally, alkylation operations are conducted under catalyst continuous conditions with a catalyst/hydrocarbon volume ratio employed in the process of the present invention is, in a broad embodiment, between about 0.005:1 and about 0.5:1, or, correspondingly, the amount of catalyst introduced is between about 0.5 vol. percent of the hydrocarbons introduced and about 30 vol. percent. Above a catalyst/hydrocarbon volume ratio of about 0.5:1, it is difficult to maintain a hydrocarbon-continuous system in the alkylation zone. In the range between about 0.5:1 and about 0.3:1 it is possible to have an acid-continuous phase in small isolated portions of the reaction mixture in the reactor at a particular time. It is therefore particularly preferred in a perferred embodiment of the present process to maintain a catalyst/hydrocarbon volume ratio in the alkylation zone of about 0.3:1 or below, corresponding to an amount of catalyst below about 25 vol. percent of the hydrocarbons. The lowest feasible catalyst/hydrocarbon volume ratio is about 0.005:1. The lower limit is primarily a function of the requirement in the present process that insoluble catalyst be present in the alkylation zone. Thus, if any smaller catalyst/hydrocarbon volume ratio is employed, all of the hydrogen fluoride would be soluble in the isoparaffin. This would prevent the obtention of an emulsion of catalyst in the hydrocarbon, which is essential to operation of the process. A preferred lower limit on the catalyst/hydrocarbon volume ratio in the alkylation zone is about 0.05. This corresponds to a catalyst concentration of about 5 vol. percent in the alkylation reaction mixture and is easily maintainable under commercial operating conditions. It is contemplated that the limitations indicated above are calculated on the basis of the volumes of catalyst and hydrocarbons introduced into an alkylation zone, regardless of the type of alkylation zone, type of mixing means, or other variations in the method of creating the alkylation reaction mixture of contacting and mixing the reactants with the catalyst which are employed in any particular embodiment. Thus, fixed quantities of the isoparaffin, propylene and hydrogen fluoride catalyst may be introduced in the above stated amounts into a suitable batch reactor and contacted therein for a suitable time and the reaction mixture resulting may be then withdrawn from the reactor and separated to recover the product in accordance with the present invention. Similarly, in a continuous-type operation, which is preferred, the isoparaffin and olefin are continuously passed into the alkylation reactor at fixed rates and therein contacted with hydrogen fluoride catalyst which is continuously passed at a regulated rate into the alkylation reactor. The catalyst and reactants are continuously admixed to form the reaction mixture and held in the reactor for a specified contact time. A portion of the reaction mixture is continuously withdrawn from the reactor at a fixed rate and passed into the settler. The present invention may be embodied in the batch-type scheme or the continuous-type scheme with equally good results, but a continuous-type operation is preferred for commercial embodiments because of known economic advantages and ease of operation.

The following examples are presented in order to illustrate the operation of the process of the present invention and to demonstrate its surprising advantages and superiority relative to conventional alkylation procedures.

EXAMPLE I

A conventional alkylation operation was performed in Run 1 in order to provide a basis for comparison with the process of the present invention. Substantially pure isobutane and propylene were utilized as the isoparaffinic and propylene reactants, and were charged to a pilot plant sized, water-cooled alkylation reactor of conventional design. A homogeneous mixture of the isobutane and propylene having an isobutane/propylene mole ratio of 12:1 was charged continuously to the reactor at the rate of 1500 cc. per hour. Conventional hydrogen fluoride catalyst of about 95% acid purity was also charged continuously to the reactor at a rate of 2850 cc. per hour, giving a conventional catalyst/hydrocarbon volume ratio of 1.9:1. The resulting catalyst continuous reaction mixture of catalyst and hydrocarbons, comprising an emulsion of hydrocarbons in a catalyst continuous phase, was agitated in the reactor for 14.4 minutes at a temperature of 80° F. Reaction mixture was continuously withdrawn from the reactor, passed to a conventional settling vessel, and settled into catalyst and hydrocarbon phases. The hydrocarbon phase was removed from the settler and fractionated to separate out an overhead fraction containing $C_4$ and lighter hydrocarbons and any dissolved catalyst. The resulting $C_5$ and heavier hydrocarbons in the fractionation bottoms were recovered as the alkylate product of the operation. The catalyst phase in the settling vessel was continuously removed and recycled to the reactor. The relevant results of a subsequent analysis of the alkylate obtained in Run 1 are tabulated in Table 1.

EXAMPLE II

In Run 2, the operation described in Example 1 was continued under exactly the same operating conditions, except that the rate of introduction of hydrogen fluoride catalyst into the alkylation reactor was reduced to 1500 cc. per hour to provide a catalyst/hydrocarbon volume ratio in the reactor of 1:1. Thus, the catalyst/hydrocarbon volume ratio was within the conventional range, and the resulting reaction mixture was made up of an emulsion of hydrocarbons in a continuous catalyst phase, to provide a catalyst continuous operation. A conventional contact time of 21 minutes was maintained in the reactor. The results of analysis of the alkylate obtained by the operation in Run 2 are tabulated in Table 1.

EXAMPLE III

In Run 3, the operation described in Example II was continued under exactly the same operating conditions, except that the rate of introduction of hdyrogen fluoride catalyst into the alkylation reactor was further reduced to 750 cc. per hour to provide a catalyst/hydrocarbon volume ratio in the reactor of 0.5:1. The resulting reaction mixture in the alkylation reactor was hydrocarbon continuous, i.e., the reaction mixture was made up of an emulsion of catalyst in a continuous hydrocarbon phase. Thus, the hydrocarbon continuous mode of operation was outside the conventional catalyst/hydrocarbon volume ratio range, since in the conventional mode of operation the catalyst/hydrocarbon volume ratio is generally at least about 1:1 and usually much higher. A contact time of 13 minutes was maintained during this run. The results of an analysis of the alkylate obtained in Run 3 are shown in Table 1.

EXAMPLE IV

In Run 4, the operation described in Example III was continued under exactly the same operating conditions except that the rate of introduction of the 12:1 molar isobutane-propylene mixture was increased to 3,000 cc. per hour. The resulting reaction mixture in the alkylation reactor was thus hydrocarbon continuous and corresponded to a catalyst/hydrocarbon volume ratio of 0.25:1. Such a catalyst/hydrocarbon volume ratio is far outside the conventional range of operation. A contact time of 16 minutes was maintained in this run. The results of an analysis of the alkylate obtained in Run 4 are tabulated in Table 1.

TABLE I

| Run | 1 | 2 | 3 | 4 |
|---|---|---|---|---|
| Conditions: | | | | |
| Temp. (° F.) | 80 | 80 | 80 | 80 |
| Contact time (min.) | 14.4 | 21 | 13 | 16 |
| iso-C₄/propylene mole ratio in feed | 12:1 | 12:1 | 12:1 | 12:1 |
| Catalyst/hydrocarbon volume ratio | 1.9:1 | 1.0:1 | 0.5:1 | 0.25:1 |
| Alkylate properties: | | | | |
| Research O.N. (clear) | 92.0 | 92.1 | 92.2 | 92.6 |
| C₇ hydrocarbons (wt. percent) | 30.4 | 34.0 | 40.3 | 44.0 |
| 2,3-dimethylpentane (wt. percent) | 16.4 | 19.2 | 27.6 | 31.9 |
| 2,3-DMP/2,4-DMP wt. ratio | 1.4 | 1.8 | 2.2 | 2.7 |
| C₈ hydrocarbons (wt. percent) | 43.3 | 43.7 | 33.0 | 34.9 |
| Trimethylpentanes/dimethylhexanes wt. ratio | 8.4:1 | 9.0:1 | 12.0:1 | 14.2 |

Referring to Table 1, the conventional alkylation operations of Run 1 and Run 2 are compared to the embodiments of the present invention in Run 3 and Run 4. On one hand, the alkylates obtained in Runs 3 and 4 have higher unleaded research octane ratings than the conventionally produced alkylates of Runs 1 and 2, although the increase is not particularly substantial in the case of Run 3. The other attributes of the alkylates produced in the four runs provide a much more surprising and substantial contrast between the conventional alkylates (Runs 1 and 2) and the alkylates obtained utilizing the present invention (Runs 3 and 4). One surprising result of the use of the present invention is a distinct increase in the total amount of $C_7$ hydrocarbons produced. This result is a direct indication that the higher octane rating of the alkylates in Runs 3 and 4 is not a result of an increase in hydrogen transfer reactions, since an increase in hydrogen transfer reactions would produce a larger fraction of $C_8$ hydrocarbons. Another surprising contrast between the conventional alkylates of Runs 1 and 2 and the alkylates of Runs 3 and 4 is a substantial increase in the amount of 2,3-dimethylpentane produced in runs embodying the present invention. The primary $C_7$ hydrocarbons which result normally from alkylation of isobutane with propylene are 2,3-dimethylpentane (2,3-DMP) and 2,4-dimethylpentane (2,4-DMP). To those skilled in the art, it will be obvious that 2,3-DMP, with a clear research octane rating (RON) of 91.1 is a much more desirable product than 2,4-DMP, which has a clear RON of 83.1. Referring to the tabulation of the weight ratio of 2,3-DMP to 2,4-DMP of the alkylates in Runs 1–4 in Table 1, it is apparent that there was no substantial difference in the amount of 2,4-DMP produced in any of the runs, while the amount of 2,3-DMP produced was increased almost two-fold in Runs 3 and 4 over the amount produced in Runs 1 and 2. Table 1 also shows a substantial decrease in the amount of $C_8$ hydrocarbon produced in Runs 3 and 4 as compared to Runs 1 and 2, further demonstrating that the octane ratings of the products in Runs 3 and 4 were not the result of a high rate of hydrogen transfer reaction, as were the octane ratings of Runs 1 and 2.

Yet another completely unexpected benefit obtained by utilization of the process of the present invention in Runs 3 and 4 is evidenced by the tabulation of the weight ratio of trimethylpentanes (TMP) to dimethylhexanes (DMH) in the alkylates produced in Runs 1–4. Because of the high octane ratings of trimethylpentanes, which have clear research octane ratings of about 100 or more, and the relatively low octane ratings of dimethylhexanes, which have clear research octane ratings of about 55.5 to about 76.3, the TMP components are much more valuable than the DMH components. From the data of Table 1, it is clear that a sizable increase in the TMP/DMH weight ratio in Runs 3 and 4 is obtained using the process of the present invention relative to the TMP/DMH weight ratio of the alkylate produced in Runs 1 and 2.

EXAMPLE V

In order to demonstrate the flexibility of the process of the present invention, further runs using the same pilot plant equipment, hydrogen fluoride catalyst and isobutane and propylene reactants as were used in Runs 1 through 4 were undertaken. In Run 5, substantially pure isobutane and substantially pure propylene were mixed at an isobutane/propylene mole ratio of 18.9:1 and the mixture was continuously charged to the alkylation reactor described in Example I at the rate of 3,000 cc. per hour. The same hydrogen fluoride catalyst used in Runs 1–4 was continuously charged to the alkylation reactor at the rate of 147 cc. per hour. The resulting catalyst/hydrocarbon volume ratio in the alkylation reactor was 0.049:1. The reaction mixture of catalysts and hydrocarbons was agitated in the reactor at a temperature of 80° F. for a contact time of 13.5 minutes and then passed to the settling vessel and separated into catalyst and hydrocarbon phases. The catalyst phase was continuously withdrawn from the settling vessel and recycled to the reactor. The hydrocarbon phase was removed from the settling vessel and split by fractionation into a fraction-containing $C_4$ and lighter hydrocarbons and any dissolved catalyst, and a $C_5$ and heavier fraction which was recovered as the alkylation reaction product. The alkylate from Run 5 was then analyzed and the results were found to be as shown in Table II.

EXAMPLE VI

In order to compare the alkylate obtained in Run 5 with an alkylate derived using a conventional catalyst/hydrocarbon volume ratio, a conventional run was undertaken using the same equipment, reactants and catalysts as were used in Run 5. In Run 6, the isobutane and propylene reactant were mixed to provide a reactor charge having an isobutane/propylene mole ratio of 45.5:1. The isobutane-propylene mixture was continuously charged to the reactor at the rate of 3,000 cc. per hour. Hydrogen fluoride catalyst was introduced to the reactor continuously at the rate of 3150 cc. per hour to provide a catalyst/ hydrocarbon volume ratio of 1.05:1, within the conventional range of operation. In this run, a reactor temperature of 80° F. and a contact time of 12.1 minutes were maintained. The alkylation reaction mixture was continuously removed from the reactor and settled in exactly the same procedure used in Run 5. The $C_5$ and heavier hydrocarbon in the settled hydrocarbon phase recovered were separated and recovered as the alkylate product of Run 6, and this alkylate was analyzed. The results are shown in Table II.

EXAMPLE VII

A further run was undertaken employing the process of the present invention. In Run 7, the isobutane and propylene were mixed to provide a reactor charge having an isobutane/propylene mole ratio of 24:1. The mixture was continuously charged to the reactor at the rate of 3,000 cc. per hour. Hydrogen fluoride catalyst was continuously charged to the reactor at the rate of 750 cc. per hour, providing a catalyst/hydrocarbon volume ratio of 0.25:1, in accordance with the present invention. A temperature of 80° F. and a contact time of 10 to about 20 minutes (the exact contact time was not noted) were maintained in the reactor. The same settling and fractionation procedure as used in the foregoing runs was employed to recover the $C_5+$ hydrocarbons as the alkylate product. The alkylate produced in Run 7 was analyzed and the results were found to be as shown in Table II.

EXAMPLE VIII

For purposes of comparison, a further run using a conventional catalyst/hydrocarbon volume ratio in the reactor was undertaken. In Run 8, the isobutane and propylene were mixed to provide a reactor charge having an isobutane/propylene mole ratio of 49.4:1. The mixture was continuously charged to the reactor at the rate of 3,000 cc. per hour. Hydrogen fluoride catalyst was continuously charged to the reactor at the rate of 6,000 cc. per hour to provide a conventional range catalyst/hydrocarbon volume ratio of 2:1. A temperature of 80° F. and a contact time of 13.7 minutes were maintained in the reactor. The $C_5+$ alkylate product of Run 8 was recovered in exactly the same procedure as utilized in Run 1–7 and analyzed. The results are shown in Table II.

TABLE II

| Run | 5 | 6 | 7 | 8 |
|---|---|---|---|---|
| Conditions: | | | | |
| Temp. (° F.) | 80 | 80 | 80 | 80 |
| Contact time (min.) | 13.5 | 12.1 | 10–20 | 13.7 |
| iso-$C_4$/propylene mole ratio in feed | 18.9:1 | 45.1:1 | 24:1 | 49.4:1 |
| Catalyst/hydrocarbon volume ratio | 0.049:1 | 1.05:1 | 0.25:1 | 2:1 |
| Alkylate properties: | | | | |
| Research O.N. (clear) | 93.7 | 93.8 | 94.6 | 94.6 |
| $C_7$ Hydrocarbons (wt. percent) | 49.3 | 34.8 | 42.4 | 30.0 |
| 2,3-dimethylpentane (wt. percent) | 40.0 | 25.4 | 34.8 | 20.5 |
| 2,3-DMP/2,4-DMP wt. ratio | 5.3 | 2.8 | 4.7 | 2.2 |
| $C_8$ hydrocarbons (wt. percent) | 37.4 | 51.7 | 36.1 | 55.3 |
| TMP/DMH wt. ratio | 21.0 | 15.7 | 19.0 | 14.5 |

Referring to Table II, the surprising results obtained when the process of the present invention is employed are further illustrated. Comparing the conditions and product obtained in Run 5, employing the present invention, with the conditions and product of Run 6, employing a conventional catalyst/hydrocarbon volume ratio, it is apparent that Run 6 required an isobutane/propylene mole ratio in the hydrocarbon feed to the reactor of 45.1:1 in order to produce an alkylate having a clear research octane rating equivalent to the octane of the alkylate obtained in Run 5, which employed an isobutane/propylene mole ratio of 18.9:1. Under commercial operating conditions, it would be completely uneconomical to operate with an isobutane/propylene mole ratio as high as 40 or higher. Comparison of the isobutane/propylene mole ratios of the feed in Run 7, using the process of the present invention, and Run 8, using a conventional catalyst/hydrocarbon volume ratio, also presents a striking contrast in the conditions required to provide high octane alkylates, the alkylate produced in Run 7 being equivalent in quality to that of Run 8, even though an extremely high isobutane/propylene mole ratio was employed in Run 8.

In both Run 5 and Run 7 there is a substantially larger weight percent of $C_7$ hydrocarbons relative to the amount in Runs 6 and 8, the increase in $C_7$ hydrocarbons in the alkylates being due almost solely to a substantial increase in production of 2,3-dimethylpentane, as compared to Runs 6 and 8. Further, the trimethylpentanes/dimethylhexanes weight ratios of the alkylates from Runs 5 and 7 are both substantially higher than those of the alkylates from Runs 6 and 8. It is clear from the foregoing that the process of the present invention, as embodied in Runs 5 and 7, is capable of providing high quality alkylate using a much lower isobutane/propylene mole ratio in the alkylation reactor feed and also with a smaller consumption of isobutane in the reaction than is possible under conventional alkylation conditions.

The increased production of $C_7$ hydrocarbons, primarily 2,3-dimethylpentane, and the decreased production of $C_8$ hydrocarbons in Runs 5 and 7, relative to conventional Runs 6 and 8, indicate that the high quality of the alkylate produced according to the process of the present invention is not the result of an increased rate of hydrogen transfer reaction. On the contrary, the high quality alkylate produced by the process of the present invention is provided by direct alkylation of isobutane with propylene, with a substantial decrease in consumption of isobutane relative to conventional operations used to provide high quality alkylate from propylene. Of the $C_8$ hydrocarbons which are produced by operating according to the present invention, as in Runs 5 and 7, a significantly larger fraction were found to be trimethylpentanes than in the alkylates of the conventional operation of Runs 6 and 8.

From the foregoing it will be apparent to those skilled in the art that the process of the present invention provides a signfiicant improvement in alkylation processes employing propylene. Among the demonstrated advantages are an increased production of high octane direct alkylation reaction products (such as 2,3-dimethylpentane) from the isoparaffin employed and propylene, with a concomitant decrease in the consumption of the isoparaffin. Moreover, an alkylate product having a desirably high octane rating can be produced without resort to employment of economically unattractive high isoparaffin/propylene mole ratio in the hydrocarbons charged to the alkylation reactor. Further economic benefits result from the use of less than 50% (and often much smaller amounts) of hydrogen fluoride catalyst than have been found necessary to produce an adequate alkylate product in conventional alkylation operations.

I claim as my invention:

1. A process for producing high quality alkylate which comprises commingling substantially pure isobutane, substantially pure propylene and hydrogen fluoride catalyst in amounts to form an alkylation reaction mixture in which the hydrocarbons constitute a continuous phase having the catalyst dispersed therein, the hydrogen fluoride catalyst and the hydrocarbons being in a ratio of said catalyst to said hydrocarbons of about 0.005 to about 0.5 volumes of said catalyst per volume of combined isobutane and propylene, subjecting said mixture to alkylation conditions, and subsequently recovering said high quality alkylate from the reaction mixture.

2. The process of claim 1 wherein the ratio of said catalyst to said isobutane and propylene reactants is about 0.05 to about 0.3 volumes of said catalyst per volume of said combined reactants.

3. The process of claim 1 wherein the mole ratio of isobutane to propylene is from about 5:1 to about 25:1.

4. A process for producing an alkylation reaction product from propylene and isobutane, utilizing hydrogen fluoride alkylation catalyst, which comprises the steps of:

(a) introducing said isobutane and said propylene into an alkylation reaction zone at an isobutane/propylene mole artio of about 5:1 to about 25:1;

(b) admixing said catalyst with said isobutane and propylene at alkylation conditions and at a catalyst/hydrocarbon volume ratio of about 0.005 to about 0.5 to form an alkylation reaction mixture comprising an emulsion of said catalyst in a continuous hydrocarbon phase;

(c) passing said reaction mixture into a settling zone and settling said reaction mixture to separate a catalyst phase from said hydrocarbon phase; and (d) recovering said alkylation reaction product from at least a portion of said hydrocarbon phase.

5. The process of claim 3 wherein said catalyst/hydrocarbon volume ratio is about 0.05 to about 0.3.

References Cited
UNITED STATES PATENTS 3,478,125  11/1969  Chapman _____ 260—683.48
3,155,742  11/1964  Holzman et al. ___ 260—683.48

DELBERT E. GANTZ, Primary Examiner

G. J. CRASANAKIS, Assistant Examiner